United States Patent
Tanaka et al.

(10) Patent No.: US 7,767,287 B2
(45) Date of Patent: Aug. 3, 2010

(54) METHOD OF MANUFACTURING OPTICAL ELEMENT, AND OPTICAL ELEMENT

(75) Inventors: Hiroyuki Tanaka, Kawasaki (JP); Masayuki Yamada, Tokyo (JP); Yoshinori Kotani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/505,624

(22) Filed: Jul. 20, 2009

(65) Prior Publication Data

US 2009/0280335 A1 Nov. 12, 2009

Related U.S. Application Data

(62) Division of application No. 12/130,073, filed on May 30, 2008.

(30) Foreign Application Priority Data

| Jun. 6, 2007 | (JP) | .............................. 2007-150689 |
| May 23, 2008 | (JP) | .............................. 2008-135692 |

(51) Int. Cl.
*B32B 1/00* (2006.01)
*B32B 9/00* (2006.01)

(52) U.S. Cl. ....................... 428/141; 428/409; 428/701; 428/702; 428/432

(58) Field of Classification Search ........................ None
See application file for complete search history.

(56) References Cited

U.S. PATENT DOCUMENTS

| 5,227,917 | A | 7/1993 | Kubo et al. | .................. 359/642 |
| 5,250,099 | A | 10/1993 | Kubo et al. | .................... 65/102 |
| 5,275,637 | A | 1/1994 | Sato et al. | ...................... 65/66 |
| 6,677,703 | B2 | 1/2004 | Ito et al. | ...................... 313/478 |
| 2005/0233113 | A1 | 10/2005 | Kotani et al. | ................. 428/141 |
| 2006/0199040 | A1 | 9/2006 | Yamada et al. | ............. 428/701 |
| 2008/0176038 | A1 | 7/2008 | Zhang et al. | ................ 428/141 |

FOREIGN PATENT DOCUMENTS

| JP | 9-202649 | 8/1997 |
| JP | 2000-344504 | 12/2000 |
| JP | 2001-17907 | 1/2001 |
| JP | 2003-4916 | 1/2003 |

*Primary Examiner*—Ling Xu
(74) *Attorney, Agent, or Firm*—Fitzpatrick, Cella, Harper & Scinto

(57) ABSTRACT

A method of manufacturing an optical element having a good reflection preventing characteristic is provided in which an irregularity structure having a reflection preventing function can be formed at low temperature. The method includes forming a film on the optical substrate by using a coating liquid containing a metal alkoxide containing at least aluminum, immersing the film in a water-containing liquid, baking the film having been immersed in the water-containing liquid, and subjecting the film having been baked to treatment with warm water to form an aluminum-containing film having a fine irregularity structure.

2 Claims, 2 Drawing Sheets

METHOD OF MANUFACTURING OPTICAL ELEMENT, AND OPTICAL ELEMENT

This application is a division of application Ser. No. 12/130,073 filed May 30, 2008.

BACKGROUND OF THE INVENTION

1. Field of the Invention

The present invention relates to a method of manufacturing an optical element having a function of suppressing the interface-reflected light amount, and to the optical element, and is suitable for optical elements of various types of optical devices including image pick-up devices such as cameras and video cameras, observation apparatuses such as telescopes and monocles, liquid crystal projectors, and optical scanning apparatuses of electrophotographic devices.

The present invention can easily provide a fine irregularity structure having a reflection preventing function on the whole surface of an optical substrate, and can provide an optical element having a favorable reflection preventing characteristic at a low temperature without thermally damaging the optical element, and hence, can be utilized for optical substrates having low heat resistance.

2. Description of the Related Art

A reflection preventing film composed of a thin film has conventionally widely been formed on an optical surface of optical elements such as lenses to reduce the optical reflection, utilizing light interference. In this case, the reflectance is a function of wavelength, and when the wavelength deviates from the designed central wavelength, the reflection reduction cannot be anticipated. Further, a film structure composed of two or more layers is adopted to enable reflection preventing films having broader bands and lower reflectance to be formed. However, in the case of multilayer films, when the wavelength deviates greatly from the designed central wavelength, the films exhibit in some cases higher reflectance than only a substrate. This is the case where incident light is perpendicular to a substrate, and in the case of inclined incident light, the thickness d is corrected by d/cos θ for the angle θ of the inclined rays to the substrate, thus exhibiting a different value from the value in the case where incident light is perpendicular to a substrate, and causing disadvantages in some cases.

In contrast with optical thin films utilizing light interference as in the above, many reflection preventing structures have recently been proposed in which a fine periodic structure of not more than the wavelength is formed on an optical surface without using an optical thin film.

Japanese Patent Application Laid-Open No. 2003-004916 discloses a window material of a display whose reflectance is reduced by providing a specific fine periodic structure on the surface of a transparent base material. The fine periodic structure has a shape in which the period PMAX of the most raised portion is set to be not more than the minimum wavelength λMIN of the visible light wavelength band in vacuum. The rate of the sectional area of the transparent base material in a horizontal sectional plane continuously gradually increases toward the most depressed portion from the most raised portion, and is set to be 1 at the most depressed portion.

The fine irregularity shape is fabricated by forming a resist layer on a glass substrate, and thereafter exposing and etching a pattern by electron-beam lithography or laser interferometry to corrode the glass substrate.

Japanese Patent Application Laid-Open No. H09-202649 proposes a petaloid transparent alumina film which is a transparent alumina film petaloidly randomly aggregated with crevices, obtained by applying a coating liquid including at least an aluminum alkoxide and a stabilizer on a base, baking the coated base at not less than 400° C. to form an amorphous alumina film, thereafter subjecting the film to hot water treatment, and only drying or drying and baking the treated film. It is described that when forming the petaloid random structure, a film can be provided having many crevices and a high specific surface area, which is useful for support materials, underlying films for water-repellent films and low reflection films.

Japanese Patent Application Laid-Open No. 2001-017907 discloses a low-temperature forming method in which a fine irregularity texture is formed on the surface of a base by applying a solution containing an aluminum compound on the base to form a film, and immersing the film in warm water without special baking. It also achieves an excellent water ultra-repellency state of a contact angle of not less than 150°, and a reflection preventing film exhibiting high transparency with a transmittance of not less than 90% in the visible region.

However, in the case of using a wet process such as a sol-gel method as in Japanese Patent Application Laid-Open No. H09-202649, since baking temperature at the time of forming a film is commonly as high as not less than 400° C., the process poses problems such that the process adversely affects the surface precision of optical substrates, and a film cannot be formed on a base material such as a resin base material unendurable to a high temperature.

On the other hand, there is a case where after a film is formed by applying a coating liquid containing a metal alkoxide containing at least aluminum and a stabilizer on an optical substrate as in Japanese Patent Application Laid-Open No. 2001-017907, if the film is immersed in warm water without specially being baked, it is dissolved out and the surface irregularity texture cannot sufficiently be formed, thus excellent reflection preventing performance is not obtained in same cases.

The present invention has been made in consideration of such related arts, and the object of the present invention is to provide an optical element in which a fine irregularity structure having a sufficient reflection preventing function can be created even by forming a film on the optical substrate surface at a low temperature from a coating liquid containing a metal alkoxide containing at least aluminum and a stabilizer and which has a good reflection preventing characteristic.

SUMMARY OF THE INVENTION

As a result of exhaustive studies, the present inventors have found that after a film is formed on an optical substrate from a coating liquid containing a metal alkoxide containing at least aluminum and a stabilizer, the film is immersed in a water-containing liquid, and baked and then subjected to warm water treatment, whereby a film having an irregularity structure on its surface which has high reflection preventing performance can be obtained by baking at lower temperature than conventional baking.

That is, a method of manufacturing an optical element for solving the above problems includes forming a film on an optical substrate by using a coating liquid containing a metal alkoxide containing at least aluminum, immersing the film in a water-containing liquid, baking the film having been immersed in the water-containing liquid, and subjecting the film having been baked to treatment with warm water to form an aluminum-containing film having an irregularity structure.

Further, the present invention relates to an optical element manufactured by the method described above.

According to the present invention, a fine irregularity structure having a reflection preventing function can be formed at low temperature even by forming a film on an optical substrate surface from a coating liquid containing a metal alkoxide containing at least aluminum and a stabilizer, and an optical element having a good reflection preventing characteristic can be provided.

Other features and advantages of the present invention will be apparent from the following description taken in conjunction with the accompanying drawings.

DESCRIPTION OF THE EMBODIMENTS

Hereinafter, the present invention will be described in detail.

The method of manufacturing an optical element according to the present invention will be described below with reference to the drawings.

Figure 1:
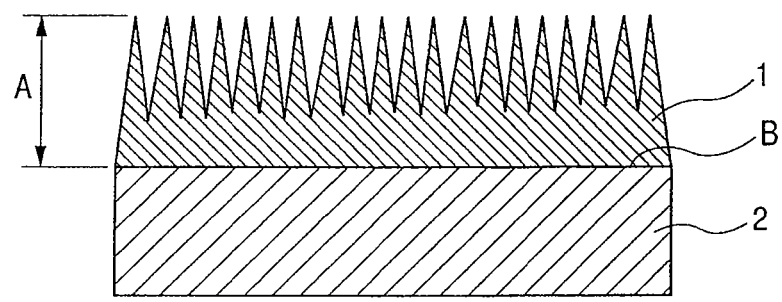
FIG. 1 is a schematic diagram illustrating an embodiment of an optical element manufactured by the method of the present invention.

FIG. 1 is a schematic diagram illustrating an embodiment of an optical element manufactured by the manufacturing method of the present invention.

In FIG. 1, the optical element of the present invention includes an optical substrate 2, and an aluminum-containing film 1 formed on the optical substrate 2 and having an irregularity structure on the surface of the film. The irregularity structure formed on the surface of the aluminum-containing film 1 has a three-dimensional structure composed of a metal compound such as an aluminum compound and crevices on the surface of the optical surface at a pitch of not more than a designed wavelength (e.g., a wavelength of 550 nm). This structure can suppress the interface-reflected light amount. A reflection preventing film including the aluminum-containing film can be formed by a method in which after a gel film is formed by applying a sol-gel coating liquid containing aluminum, the surface of the film is treated with warm water to form plate crystals having aluminum oxide (alumina) as a main ingredient. The plate crystals having aluminum oxide (alumina) as a main ingredient correspond to the fine irregularity structure on the surface of the aluminum-containing film. The plate crystals having aluminum oxide as a main ingredient are formed from crystals whose main ingredient is an oxide or hydroxide of aluminum or their hydrates. A particularly preferable crystal is boehmite. An irregularity structure whose end is fine is formed by arranging such plate crystals, and hence, in order to enlarge the heights of the irregularities of the fine irregularity structure and to narrow the intervals thereof, the plate crystals are preferably arranged selectively in the direction of not less than 45° and not more than 90° with respect to the optical substrate.

The film thickness A of the aluminum-containing film 1 having a fine irregularity structure on its surface is not less than 0.01 µm and not more than 10 µm, preferably not less than 0.1 µm and not more than 3 µm. Here, the film thickness A of the aluminum-containing film 1 refers to the total thickness of the fine irregularity structure having aluminum oxide as a main ingredient and a thin film layer to support the irregularity structure.

In the optical element of the present invention, a plurality of films each having a reflection preventing function originated from a fine irregularity structure, including a metal compound such as an aluminum compound, may be formed on an optical surface such as a plane surface, a curved surface (including a spherical surface, non-spherical surface and rotational asymmetrical surface) or a curved surface group in which a plurality of curved surfaces are arranged (a cylindrical surface, a toric surface or a surface in which these surfaces are arranged).

The optical element includes lenses, fθ lenses, prisms, parallel flat plates and fly-eye integrators.

The optical element of the present invention is used for various types of optical systems such as image forming optical systems, observation optical systems, image pick-up systems and scanning optical systems.

Next, the method of manufacturing an optical element according to the present invention will be described below.

(1) The Step of Forming a Film on an Optical Substrate:

First, a film is formed on an optical substrate using a coating liquid containing a metal alkoxide containing at least aluminum.

The optical substrate used in the present invention can be any material as long as it can finally be made into a shape according to the intended use, and may be a flat plate, film or sheet, or a material having a two-dimensional curved surface or a three-dimensional curved surface. The thickness can suitably be set, and is generally not more than 5 mm, but is not limited thereto.

Base materials for the optical substrate used in the present invention include glass, plastic base materials, glass mirrors and plastic mirrors. The glass specifically includes optical glasses such as non-alkali glass, alumina-silicate glass, borosilicate glass, high-refractive index low-dispersion glasses containing barium or a rare earth, and fluorine-type low-refractive index glasses. The plastic base materials typically include films and molded products of thermoplastic resins such as polyester, triacetyl cellulose, cellulose acetate, polyethylene terephthalate, polyolefin, polycycloolefin, polypropylene, polystyrene, polycarbonate, polymethyl methacrylate, ABS resins, polyphenylene oxide, polyurethane, polyethylene and polyvinyl chloride; and crosslinked films and crosslinked molded products obtained from various types of thermosetting resins such as unsaturated polyester resins, phenol resins, crosslinkable polyurethanes, crosslinkable acrylic resins and crosslinkable saturated polyester resins.

The optical substrate used in the present invention may previously have been provided with an intermediate layer different in refractive index on the surface of a base material.

The intermediate layer specifically includes silica, titanium oxide, zirconium oxide, lanthanum trioxide, hafnium oxide, tin oxide, aluminum oxide, yttrium oxide and tantalum oxide films, and composite films thereof. The intermediate layer can be formed by a known method such as a gas phase method in CVD or PVD, a liquid phase method including a sol-gel method, and hydrothermal synthesis using an inorganic salt.

The coating liquid used in the present invention contains a metal alkoxide containing at least aluminum and a stabilizer; these raw materials are dissolved or dispersed in an organic solvent and used. In the case of using a metal alkoxide raw material including aluminum or the like, since the raw material has a high reactivity with water, it is rapidly hydrolyzed by moisture in air or addition of water and generates white turbidity and precipitate, causing a poor stability of the solution. With the aim of stabilizing the solution, a stabilizer is added to inhibit the metal alkoxide from being hydrolyzed. A catalyst may be added for the purpose of promoting the hydrolysis.

The coating liquid containing a metal alkoxide containing at least aluminum and a stabilizer is applied on the optical substrate to form an aluminum-containing film. The aluminum-containing film can be formed by a liquid phase method in sol-gel.

The metal alkoxide to be used as a raw material of the coating liquid is an aluminum compound, and such compounds as zirconium, silicon, titanium and zinc compounds may be added simultaneously therewith.

The aluminum compound includes, for example, aluminum ethoxide, aluminum isopropoxide, aluminum n-butoxide, aluminum sec-butoxide, aluminum tert-butoxide, aluminium acetylacetonate, and oligomers thereof, aluminum nitrate, aluminum chloride, aluminum acetate, aluminum phosphate, aluminum sulfate and aluminum hydroxide.

The zirconium compound specifically includes zirconium tetramethoxide, zirconium tetraethoxide, zirconium tetra-n-propoxide, zirconium tetraisopropoxide, zirconium tetra-n-butoxide and zirconium tetra-t-butoxide.

The silicon compound to be used includes various types of alkoxides represented by the general formula $Si(OR)_4$ wherein R's are the same or different and are each a lower alkyl group such as a methyl group, ethyl group, propyl group, isopropyl group, butyl group and isobutyl group.

The titanium compound includes tetramethoxytitanium, tetraethoxytitanium, tetra-n-propoxytitanium, tetraisopropoxytitanium, tetra-n-butoxytitanium and tetraisobutoxytitanium.

The zinc compound includes, for example, zinc acetate, zinc chloride, zinc nitrate, zinc stearate, zinc oleate and zinc salicylate; especially zinc acetate and zinc chloride are preferable.

The organic solvent includes, for example, alcohols such as methanol, ethanol, 2-propanol, butanol, ethylene glycol and ethylene glycol mono-n-propyl ether; various types of aliphatic or alicyclic hydrocarbons such as n-hexane, n-octane, cyclohexane, cyclopentane and cyclooctane; various types of aromatic hydrocarbons such as toluene, xylene and ethylbenzene; various types of esters such as ethyl formate, ethyl acetate, n-butyl acetate, ethylene glycol monomethyl ether acetate, ethylene glycol monoethyl ether acetate and ethylene glycol monobutyl ether acetate; various types of ketones such as acetone, methyl ethyl ketone, methyl isobutyl ketone and cyclohexanone; various types of ethers such as dimethoxyethane, tetrahydrofuran, dioxane and diisopropyl ether; various types of chlorinated hydrocarbons such as chloroform, methylene chloride, carbon tetrachloride and tetrachloroethane; and aprotic polar solvents such as N-methylpyrrolidone, dimethylformamide, dimethylacetamide and ethylene carbonate. When a coating solution to be used in the present invention is prepared, it is preferable to use alcohols among the various types of solvents described above in view of the stability of the solution.

In the case of using a metal alkoxide raw material including aluminum or the like, since the raw material has high reactivity with water, it is rapidly hydrolyzed by moisture in air or addition of water and generates white turbidity and precipitate, causing a poor stability of the solution.

For the purpose of suppressing the hydrolysis of the metal alkoxide, a stabilizer is added to stabilize the solution.

The stabilizer includes, for example, β-diketone compounds such as acetylacetone, dipivaloylmethane, trifluoroacetylacetone, hexafluoroacetylacetone, benzoylacetone and dibenzoylmethane; β-ketoester compounds such as methyl acetoacetate, ethyl acetoacetate, allyl acetoacetate, benzyl acetoacetate, isopropyl acetoacetate, tert-butyl acetoacetate, isobutyl acetoacetate, 2-methoxyethyl acetoacetate and methyl 3-keto-n-valerate; and alkanolamines such as monoethanolamine, diethanolamine and triethanolamine. The addition amount of the stabilizer is preferably 0.1 to 5, more preferably 0.5 to 2 in molar ratio with respect to the metal alkoxide.

Usable catalysts include, for example, acid catalysts such as nitric acid, hydrochloric acid, sulfuric acid, phosphoric acid and acetic acid, basic catalysts such as ammonia, and besides these inorganic catalysts, organic catalysts.

In a solution coating method, as a method for forming a coating film on an optical substrate, known coating means can suitably be employed such as dipping, spin coating, spraying, printing, flow coating, and concomitant use thereof. The film thickness can be controlled by varying a pulling-up speed in a dipping method, or a substrate rotating speed in a spin coating method, and by varying the concentration of the coating solution.

The coating film formed by the above means is dried at room temperature for about 30 min. As required, the film may be dried or subjected to heat treatment at higher temperature, but the heating temperature is preferably not more than 300° C. The drying or heat treatment is referred to as temporary baking.

(2) The Step of Immersing the Film in a Water-Containing Liquid:

Then, the film formed on the optical substrate in "(1) the step of forming a film on an optical substrate" is immersed in a water-containing liquid. The water-containing liquid refers to a liquid containing water, and may be a mixed liquid of an alcohol and water. It is preferable that water is used by itself. The temperature is preferably not less than 5° C. and not more than 50° C. If the temperature of the water-containing liquid is more than 50° C., the film is dissolved and the crystallization of aluminum oxide is caused, making the structure control difficult. If the temperature of the water-containing liquid is less than 5° C., it starts to solidify and flowability is lowered so that the effect is not sufficiently obtained. Immersion is effective even in a short time. Specifically, the immersing time is preferably not less than 1 minute and not more than 1 hour, more preferably not less than 5 minutes and not more than 20 minutes.

(3) The Step of Baking the Film after Immersion in the Water-Containing Liquid:

Then, the film having been immersed in the water-containing liquid in "(2) the step of immersing the film in a water-containing liquid" is baked to form a gel film containing aluminum oxide as a main ingredient. The baking temperature is not especially limited, but is preferably not less than 60° C. and not more than 300° C., more preferably not less than 60° C. and not more than 200° C., still further preferably not less than 60° C. and not more than 150° C. If the baking temperature exceeds 300° C., there is a fear for a bad influence on the surface precision of the optical glass component and damage to the glass. It is difficult to apply baking at a temperature exceeding 150° C. to an organic polymer base material having low heat resistance. With baking at a temperature of less than 60° C., the film is dissolved in the treatment with warm water performed in the next step, and a good reflection preventing characteristic is not achievable.

(4) The Step of Forming an Aluminum-Containing Film Having an Irregularity Structure by Treating the Film Having been Baked with Warm Water Subsequently, the film having been baked in "(3) the step of baking the film after immersion in the water-containing liquid" is immersed in warm water or exposed to steam to subject its surface to dissolution or deposition, to thereby form a fine irregularity structure originated from plate crystals of aluminum oxide. Hereinafter, the treatment of immersion in warm water or exposure to steam is referred to as the warm water treatment. Due to the warm water treatment, the surface layer of the aluminum oxide gel film undergoes deflocculation action and the like and some of the ingredients are eluted, but because of the differences in solubility between various types of hydroxides in warm water, plate crystals containing aluminum oxide as a main ingredient are deposited and grow on the surface layer of the gel film. When the film is immersed in warm water, the temperature of the warm water is preferably not less than 60° C. and not more than 100° C. If the temperature of the warm water is less than 60° C., plate crystals are difficult to form, and if being more than 100° C., it is vaporized. The warm water treatment time is preferably not less than 5 minutes and not more than 24 hours, more preferably not less than 15 minutes and not more than 1 hour.

The film thickness of the aluminum-containing film 1, having an irregularity structure on its surface, formed by the warm water treatment according to the present invention is not less than 0.01 µm and not more than 10 µm, preferably not less than 0.1 µm and not more than 3 µm. In the present invention, the film thickness refers to the total thickness of the fine irregularity structure containing aluminum oxide as a main ingredient and a thin film layer to support the fine irregularity structure. That is, the above thickness means a thickness A of a part which reference numeral 1 denotes in FIG. 1.

The refractive index $n_1$ of the aluminum-containing film 1 obtained in the present invention increases from its surface toward the boundary part B (see FIG. 1) with the optical substrate. The reason for this is considered to be that the plate crystals are densified from the air interface (surface) toward the thin film layer supporting the plate crystals. In addition, since the thin film layer supporting the fine irregularity structure has an intermediate refractive index between the refractive index of the optical substrate and the refractive index of the layer composed of the plate crystals at the interface with the thin film supporting the plate crystals, the reflection preventing performance is considered to be improved.

Conventionally, an aluminum-containing thin film having a fine structure obtained by treating with warm water a film subjected to baking at a high temperature of not less than 400° C. exhibits high reflection preventing performance, but a film having a fine structure obtained through baking at a lower temperature does not exhibit sufficient reflection preventing performance in some cases. As the cause thereof, it is conceivable that the bond progressing degree in the film before the warm water treatment exerts an influence, and when the bond progressing degree is sufficient, high reflection preventing performance tends to be exhibited. The bond progressing degree of a film before the warm water treatment is supposedly influenced by the growing degree of an aluminum oxide precursor in a coating liquid, the baking process after the film formation and the like. The stabilizer added for the purpose of stabilizing a coating liquid is essential for suppressing the hydrolysis and polycondensation reaction of the aluminum alkoxide. On the other hand, the stabilizer acts to inhibit the formation of the aluminum oxide structure.

This is conceivably because, in the case of baking at a high temperature of, e.g., 400° C., since the organic ingredients in a film containing a stabilizer and unreacted alkoxyl groups decompose and the polycondensation reaction is promoted, the heat treatment creates a structure in which stronger bonds than before the heat treatment are formed.

In contrast, in the case of baking at a low temperature of not more than 300° C., particularly not more than 200° C., the baking cannot completely decompose the organic ingredients in a film containing a stabilizer and unreacted alkoxyl groups, supposedly resulting in insufficient bond formation.

Accordingly, in the present invention, a film is immersed in a water-containing liquid before baking to elute and remove the stabilizer in the film and the baking is performed in the state of containing moisture in the film, so that unreacted alkoxyl groups are reduced, thereby conceivably promoting bond formation. Hence, bond formation comparable to that in the film obtained through baking at high temperature can be effected even through baking at low temperature, thus enabling excellent reflection preventing performance to be exhibited.

The reflection preventing film including the aluminum-containing film in the present invention can be provided further with layers for imparting various functions. For example, for improving the film hardness, a hard coat layer may be provided; for improving the adhesiveness between a transparent base material and the hard coat layer, an adhesive layer and a primer layer may be provided. The refractive indexes of such layers as above provided between the transparent base material and the hard coat layer are preferably in the middle between the refractive index value of the transparent base material and the refractive index of the hard coat layer.

EXAMPLES

Hereinafter, the present invention will be described specifically by way of Examples. However, the present invention is not limited to these Examples.

The following measurements were made for transparent films having fine irregularities on their surface, obtained by the Examples and the Comparative Examples.

(1) Measurement of Reflectance

Vertical transmittance T (%; incident angle: 0°) measured by using a transmissometer (U-4000, made by Hitachi, Ltd.) was converted into vertical reflectance r (%; incident angle: 0°) according to the following expression.

$r(\lambda)=100\times(100-T(\lambda))/(100+T(\lambda))$ ($\lambda$=400, 410, 420 to 680, 690, 700 nm)　　(Expression 1)

Average reflectance $R=\Sigma r(\lambda$=400, 410, 420 to 680, 690, 700 nm$)/31$　　(Expression 2)

(2) Measurement of Refractive Index

A spectroscopic ellipsometer (M-2000, made by J. A. Woolam Co., Ltd.) was used for the refractive index analysis of a film.

(3) Measurement of Film Thickness

The film thickness was measured using a cross-section SEM (FE-SEM S-4800, made by Hitachi, Ltd.), and the actual measurement was used as the film thickness.

Example 1

A quartz substrate of 26 mm×76 mm in size and 1 mm in thickness was washed with a neutral detergent and then with pure water in order, and dried to prepare a glass substrate for coating.

23 parts by mass of aluminum sec-butoxide (Al(O-sec-Bu)$_3$) was dissolved in 114 parts by mass of 2-propanol (IPA), and 12 parts by mass of ethyl acetoacetate (EAcAc) as a stabilizer was added to the solution, and stirred for about 3 hours at room temperature to prepare an Al$_2$O$_3$ sol solution as a coating liquid. The molar ratio of the solution was set at Al(O-sec-Bu)$_3$:IPA:EAcAc=1:20:1.

Then, the glass substrate for coating (refractive index ne=1.524) was immersed in the coating liquid, and thereafter, a coating film was formed on the glass substrate surface by a dipping method (pull-up speed of 2 mm/sec, 20° C., 56% R.H.).

The coated glass substrate was preliminarily dried at 300° C. for 10 minutes, then immersed in distilled water of 30° C. for 10 minutes to remove the stabilizer, and thereafter subjected to heat treatment at 300° C. for 2 hours, to thereby obtain a transparent amorphous $Al_2O_3$ gel film. Next, the gel film was immersed in hot water of 80° C. for 30 minutes, and thereafter dried at 60° C. for 10 minutes, to thereby obtain a quartz substrate having a reflection preventing film including aluminum oxide (alumina).

As a result of observation with an FESEM, the obtained film was found to be an aluminum-containing thin film including a fine structure of aluminum oxide (alumina).

The reflectance of the obtained quartz substrate having the reflection preventing film is shown in Table 1. The result of the refractive index analysis using an ellipsometer is shown in Table 2.

Example 2

A quartz substrate having a reflection preventing film was fabricated and measured as in Example 1, except that the preliminary drying was carried out at 200° C. for 10 minutes and the heat treatment after the removal of the stabilizer was carried out at 200° C. for 2 hours. The results obtained are shown in Tables 1 and 2.

Example 3

A quartz substrate having a reflection preventing film was fabricated and measured as in Example 1, except that the preliminary drying was carried out at 100° C. for 30 minutes and the heat treatment after the removal of the stabilizer was carried out at 100° C. for 3 hours. The results obtained are shown in Tables 1 and 2.

Example 4

A quartz substrate having a reflection preventing film was fabricated and measured as in Example 1, except that the preliminary drying was carried out at 80° C. for 30 minutes and the heat treatment after the removal of the stabilizer was carried out at 80° C. for 3 hours. The results obtained are shown in Table 1.

Example 5

A quartz substrate having a reflection preventing film was fabricated and measured as in Example 2, except that the removal of the stabilizer after the preliminary drying was performed using an ethanol/water mixed solution (concentration of 10 wt. %). The results obtained are shown in Table 1.

Example 6

A substrate having a reflection preventing film was fabricated and measured as in Example 3, except that a polymethyl methacrylate was used as the substrate. The results obtained are shown in Table 1.

Example 7

A substrate having a reflection preventing film was fabricated and measured as in Example 3, except that a polycarbonate was used as the substrate. The results obtained are shown in Tables 1 and 2.

Example 8

A substrate having a reflection preventing film was fabricated and measured as in Example 3, except that a polyolefin (ZEONEX 480R polyolefin, made by Zeon Corp., thickness of 1 mm) was used as the substrate. The results obtained are shown in Table 1.

Example 9

A substrate having a reflection preventing film was fabricated and measured as in Example 4, except that a polymethyl methacrylate was used as the substrate. The results obtained are shown in Table 1.

Example 10

A substrate having a reflection preventing film was fabricated and measured as in Example 4, except that a polycarbonate was used as the substrate. The results obtained are shown in Table 1.

Example 11

A substrate having a reflection preventing film was fabricated and measured as in Example 4, except that a polyolefin was used as the substrate. The results obtained are shown in Table 1.

Example 12

An $Al_2O_3$ sol solution was prepared in the same way as in Example 1.

Titanium-n-butoxide ($Ti(O-n-Bu)_4$) was dissolved in IPA, and thereafter, EAcAc was added and stirred for about 3 hours at room temperature to prepare a $TiO_2$ sol solution. The molar ratio of the solution was set at $Ti(O-n-Bu)_4$:IPA:EAcAc=1:20:1.

This $TiO_2$ sol solution was added in the above $Al_2O_3$ sol solution so that $Al_2O_3$:$TiO_2$ was set to be 0.9:0.1 in weight ratio, and stirred for about 30 minutes, and then, 0.01M [HClaq.] was added and stirred for about 3 hours at room temperature. Thus, a coating liquid, which was an $Al_2O_3$—$TiO_2$ sol, was prepared. In this case, the addition amount of HCLaq. was set to be the total amount of twice the amount of $Al(O-sec-Bu)_3$ in molar ratio and twice the amount of $Ti(O-n-Bu)_4$ in molar ratio.

Next, the glass substrate for coating (refractive index ne=1.805) was immersed in the coating liquid, and then, a coating film was formed on the glass substrate surface by a dipping method (pull-up speed of 2 mm/sec, 20° C., 56% R.H.).

The coated glass substrate was preliminarily dried at 300° C. for 10 minutes, then immersed in distilled water of 30° C. for 10 minutes to remove the stabilizer, and thereafter, subjected to heat treatment at 300° C. for 2 hours, to thereby obtain a transparent amorphous $Al_2O_3$—$TiO_2$ gel film. Next, the gel film was immersed in hot water of 80° C. for 30 minutes, and thereafter, dried at 60° C. for 10 minutes, to thereby obtain a glass substrate having a reflection preventing film.

The reflectance of the obtained glass substrate having the reflection preventing film is shown in Table 1.

Example 13

An $Al_2O_3$ sol solution was prepared in the same way as in Example 1. In addition, zinc acetate dihydrate ($Zn(CH_3CO$ O)$_2$.2H$_2$O) was dissolved in IPA, and monoethanolamine (MEA) was added, and stirred at room temperature for about 3 hours to prepare a ZnO solution. The molar ratio of the solution was set at Zn(CH$_3$COO)$_2$.2H$_2$O:IPA:MEA=1:10:1. This ZnO sol solution was added in the above Al$_2$O$_3$ sol solution so that Al$_2$O$_3$:ZnO was set to be 0.9:0.1 in weight ratio, and stirred for about 3 hours at room temperature. Thus, a coating liquid, which was an Al$_2$O$_3$—ZnO sol, was prepared.

Next, the glass substrate for coating (refractive index ne=1.805) was immersed in the coating liquid, and then, a coating film was formed on the glass substrate surface by a dipping method (pull-up speed of 2 mm/sec, 20° C. 56% R.H.).

The coated glass substrate was preliminarily dried at 300° C. for 10 minutes, then immersed in distilled water of 30° C. for 10 minutes to remove the stabilizer, and thereafter, subjected to heat treatment at 300° C. for 2 hours, to thereby obtain a transparent amorphous Al$_2$O$_3$—ZnO gel film. Next, the gel film was immersed in hot water of 80° C. for 30 minutes, and thereafter, dried at 60° C. for 10 minutes, to thereby obtain a glass substrate having a reflection preventing film.

The reflectance of the obtained glass substrate having the reflection preventing film is shown in Table 1.

Example 14

Preparation of Intermediate Layer Coating Liquid

Tetraethoxysilane (TEOS), IPA, and 0.01M(HClaq.) were mixed, stirred at room temperature for 3 hours to prepare a SiO$_2$ sol solution. The molar ratio of the liquid was set at TEOS:IPA=1:20.

Titanium-n-butoxide (Ti—(O-n-Bu)$_4$ was dissolved in IPA, and thereto, EAcAc was added and stirred at room temperature for 3 hours to prepare a TiO$_2$ sol solution. The molar ratio of the solution was set at Ti—(O-n-Bu)$_4$:IPA:EAc=1:20:1.

This TiO$_2$ sol solution was added in the SiO$_2$ sol solution so that SiO$_2$:TiO$_2$ came to be 0.8:0.2, and stirred for 30 minutes, and then, 0.01M(HClaq.) was added and stirred for 3 hours. Thus, an intermediate layer coating solution, which was a SiO$_2$—TiO$_2$ sol, was prepared.

Next, the glass substrate for coating (refractive index ne=1.805) was immersed in the coating liquid, and then, a SiO$_2$—TiO$_2$ coating film was formed on the glass substrate surface by a dipping method (pull-up speed of 2 mm/sec, 20° C. 56% R.H.). After that, a reflection preventing film formed from aluminum oxide (alumina) was formed in the same manner as in Example 1.

The reflectance of the obtained glass substrate having the reflection preventing film is shown in Table 1.

Example 15

The transparent amorphous Al$_2$O$_3$ gel film having passed through the drying step in Example 1 was exposed to steam, to thereby obtain a glass substrate having a reflection preventing film formed from aluminum oxide (alumina). Specifically, treatment with steam was carried out for 30 minutes by means of a water oven (AX-HX4, manufactured by SHARP Corporation).

The reflectance of the obtained glass substrate having the reflection preventing film is shown in Table 1.

Comparative Example 1

A coating film was formed on the surface of a glass substrate (ne=1.524), and then subjected to heat treatment at 300° C. for 2 hours, to thereby obtain a transparent amorphous Al$_2$O$_3$ gel film. Then, the gel film was immersed in hot water of 80° C. for 30 minutes, and thereafter dried at 60° C. for 10 min, to thereby obtain a substrate having a reflection preventing film including aluminum oxide. The results obtained are shown in Tables 1 and 2.

Comparative Example 2

A glass substrate having a reflection preventing film was fabricated and measured as in Comparative Example 1, except that the heat treatment was carried out at 200° C. for 2 hours. The results obtained are shown in Tables 1 and 2.

Comparative Example 3

A glass substrate having a reflection preventing film was fabricated and measured as in Comparative Example 1, except that the heat treatment in Comparative Example 1 was carried out at 100° C. for 3 hours. The results obtained are shown in Tables 1 and 2.

Comparative Example 4

A glass substrate having a reflection preventing film was fabricated and measured as in Comparative Example 1, except that the heat treatment was carried out at 80° C. for 3 hours. The results obtained are shown in Table 1.

Comparative Example 5

A glass substrate having a reflection preventing film was fabricated and measured as in Comparative Example 2, except that the heat treatment was carried out at 200° C. for 24 hours. The results obtained are shown in Table 1.

Comparative Example 6

A substrate having a reflection preventing film was fabricated and measured as in Comparative Example 4, except that a polymethyl methacrylate was used as the substrate. The results obtained are shown in Table 1.

Comparative Example 7

A substrate having a reflection preventing film was fabricated and measured as in Comparative Example 4, except that a polycarbonate was used as the substrate. The results obtained are shown in Table 1.

Comparative Example 8

A substrate having a reflection preventing film was fabricated and measured as in Comparative Example 4, except that a polyolefin was used as the substrate. The results obtained are shown in Table 1.

TABLE 1

| | substrate | baking conditions | removal of stabilizer | average reflectance R(%) |
|---|---|---|---|---|
| Example 1 | glass | 300° C., 2 hr | distilled water | 0.16 |
| Example 2 | glass | 200° C., 2 hr | distilled water | 0.17 |
| Example 3 | glass | 100° C., 3 hr | distilled water | 0.25 |
| Example 4 | glass | 80° C., 3 hr | distilled water | 0.28 |
| Example 5 | glass | 200° C., 2 hr | ethanol/water | 0.18 |
| Example 6 | PMMA | 100° C., 3 hr | distilled water | 0.24 |
| Example 7 | PC | 100° C., 3 hr | distilled water | 0.27 |
| Example 8 | polyolefin | 100° C., 3 hr | distilled water | 0.25 |
| Example 9 | PMMA | 80° C., 3 hr | distilled water | 0.28 |
| Example 10 | PC | 80° C., 3 hr | distilled water | 0.30 |
| Example 11 | polyolefin | 80° C., 3 hr | distilled water | 0.30 |
| Example 12 | glass | 200° C., 2 hr | distilled water | 0.22 |
| Example 13 | glass | 200° C., 2 hr | distilled water | 0.20 |
| Example 14 | glass | 200° C., 2 hr | distilled water | 0.17 |
| Example 15 | glass | 300° C., 2 hr | distilled water | 0.20 |
| Comparative Example 1 | glass | 300° C., 2 hr | — | 0.33 |
| Comparative Example 2 | glass | 200° C., 2 hr | — | 0.35 |
| Comparative Example 3 | glass | 100° C., 3 hr | — | 0.49 |
| Comparative Example 4 | glass | 80° C., 3 hr | — | 0.55 |
| Comparative Example 5 | glass | 200° C., 24 hr | — | 0.35 |
| Comparative Example 6 | PMMA | 80° C., 3 hr | — | 0.50 |
| Comparative Example 7 | PC | 80° C., 3 hr | — | 0.55 |
| Comparative Example 8 | polyolefin | 80° C., 3 hr | — | 0.55 |

(Notes)
PMMA: polymethyl methacrylate
PC: polycarbonate

TABLE 2

| | baking conditions | refractive index n |
|---|---|---|
| Example 1 | 300° C., 2 hr | 1.40 |
| Example 2 | 200° C., 2 hr | 1.40 |
| Example 3 | 100° C., 3 hr | 1.45 |
| Comparative Example 1 | 300° C., 2 hr | 1.48 |
| Comparative Example 2 | 200° C., 2 hr | 1.50 |
| Comparative Example 3 | 100° C., 3 hr | 1.50 |

As shown in Table 1, making a comparison between the cases where the immersion in the water-containing liquid was performed and the cases where the immersion in the water-containing liquid was not performed, the cases where the immersion was performed was found to have an improved reflection preventing characteristic.

Further, as shown in Table 2, in the cases where the aluminum-containing film was an aluminum oxide film, the refractive index $n_2$ of the aluminum oxide film at the boundary part (B in FIG. 1) with the optical substrate is in the range of $1.30 \leq n_2 \leq 1.45$ when the immersion into the water-containing liquid was performed, and the refractive index in this range was found to give a good reflection preventing characteristic.

When the immersion in the water-containing liquid was performed, it was found that the average reflectance became small; the refractive index became small; and the reflection preventing characteristic was improved. This is conceivably because the immersion in the water-containing liquid makes the film porous.

Figure 2:
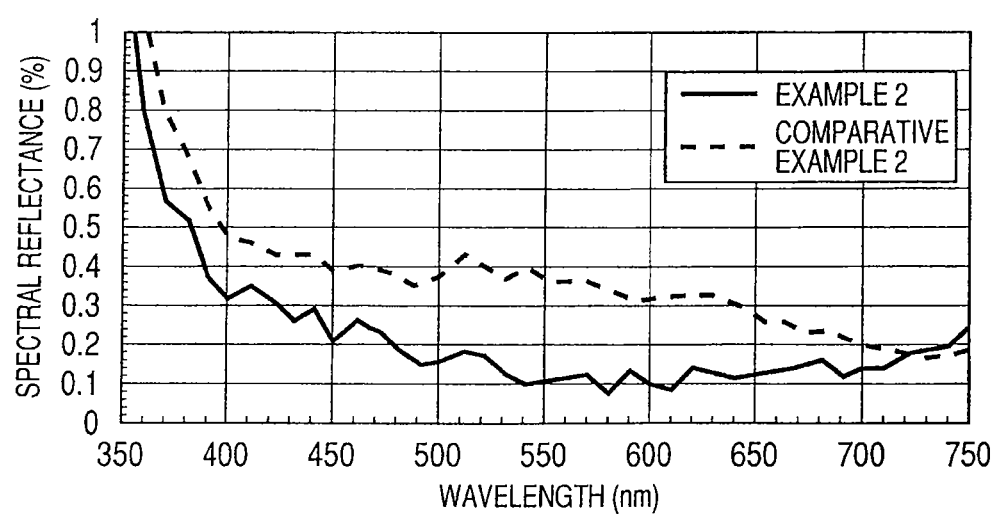
FIG. 2 is a diagram illustrating relations of spectral reflectance (R(%)) to wavelengths (nm) of light in Example 2 and Comparative Example 2 of the present invention.

In FIG. 2, the relationships between the wavelengths (nm) of light and the spectral reflectances (R(%)) in Example 2 and Comparative Example 2 of the present invention are illustrated.

Figure 3:
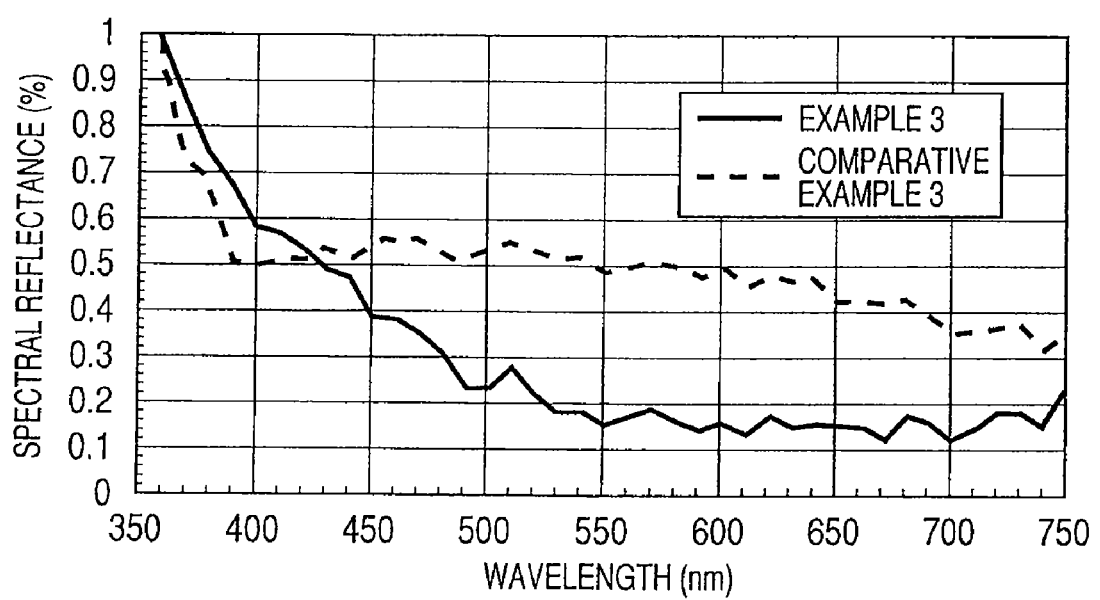
FIG. 3 is a diagram illustrating relations of spectral reflectance (R(%)) to wavelengths (nm) of light in Example 3 and Comparative Example 3 of the present invention.

In FIG. 3, the relationships between the wavelengths (nm) of light and the spectral reflectance (R(%)) in Example 3 and Comparative Example 3 of the present invention are illustrated.

From the results shown in FIGS. 2 and 3, the Examples are found to have substantially lower reflectance than the Comparative Examples, and performing baking after the immersion in water is found to be effective for providing a film having high reflection preventing performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-150689, filed Jun. 6, 2007 and 2008-135692, May 23, 2008, which are hereby incorporated by reference herein in their entirety.

What is claimed is:

1. An optical element comprising an optical substrate and an aluminum oxide film,
   wherein the aluminum oxide film has an irregularity structure on its surface, and
   wherein an average reflectance R (%) of the optical element satisfies the following condition: $0.16 \leq R \leq 0.3$.

2. An optical element according to claim 1, wherein a refractive index $n_1$ of the aluminum oxide film on the optical substrate increases from its surface toward a boundary part with the optical substrate, and
   wherein a refractive index $n_2$ of the aluminum oxide film at the boundary part is in a range of $1.30 \leq n_2 \leq 1.45$.

* * * * *